United States Patent [19]

Washio et al.

[11] 4,290,330

[45] Sep. 22, 1981

[54] BANDSAW BLADE GUIDING APPARATUS

[75] Inventors: Isomi Washio, Odawara; Kenji Onishi, Isehara, both of Japan

[73] Assignee: Amada Company, Ltd., Isehara, Japan

[21] Appl. No.: 118,731

[22] Filed: Feb. 5, 1980

[30] Foreign Application Priority Data

Feb. 6, 1979 [JP] Japan .................... 54-13432[U]

[51] Int. Cl.³ .......................................... B27B 13/10
[52] U.S. Cl. ............................. 83/820; 83/171; 83/823; 83/824
[58] Field of Search .............. 83/820, 824, 823, 171

[56] References Cited

U.S. PATENT DOCUMENTS

| 446,127 | 2/1891 | Wright | 83/824 X |
| 2,914,101 | 11/1959 | Blum | 83/824 X |
| 3,064,698 | 11/1962 | LaForce | 83/824 X |
| 3,104,576 | 9/1963 | Robinson | 83/820 X |
| 3,435,640 | 4/1969 | Flekac | 83/820 X |
| 3,848,493 | 11/1974 | Harris | 83/820 X |
| 4,014,235 | 3/1977 | Fukami | 83/820 X |

*Primary Examiner*—Frank T. Yost
*Attorney, Agent, or Firm*—Thompson, Birch, et al.

[57] ABSTRACT

A bandsaw blade guiding apparatus has a support arm forming a cavity through which the blade moves. The cavity contains a resiliently supported anti-friction member which has a flat surface contacting the back edge of the blade during a cutting operation.

2 Claims, 3 Drawing Figures

BANDSAW BLADE GUIDING APPARATUS

BACKGROUND OF THE INVENTION

1. Field of the Invention

The present invention relates generally to bandsaw machines having a flexible endless bandsaw blade trained around a plurality of wheels or pulleys to perform cutting operations and, more particularly, pertains to a guiding apparatus for holding and guiding the bandsaw blade.

2. Description of the Prior Art

As is well-known, bandsaw machines include a flexible endless bandsaw blade which is trained around a plurality (usually a pair) of wheels or pulleys, one of which is power driven to drive the bandsaw blade in order to perform cutting operations. One of the stretches of the bandsaw blade trained around the wheels is slidably held or guided by a pair of guide means at the cutting zone where cutting operations are to be made so that the bandsaw blade can cut into workpieces without sideward motion and with reduced vibrations. In horizontal bandsaw machines, the bandsaw blade is held by the guide means in a saw head assembly which is so arranged as to be lowered toward workpieces to be cut, and thus the bandsaw blade is fed into the workpieces to cut the same when the saw head assembly is lowered. Also, in vertical bandsaw machines, the bandsaw blade is held vertical at the cutting zone by the guide means, and in cutting operations workpieces to be cut are fed manually or by power into the bandsaw blade being driven around the wheels. Thus, in bandsaw machines, the bandsaw guide means has to hold the bandsaw blade not only against its sideward motion but also against the feeding force with which the bandsaw blade is fed into the workpiece to be cut or vice versa. For these purposes, each of the guide means of the bandsaw machines comprises a pair of guide members for holding the sides of the bandsaw blade against its sideward motion and a back-up guide member for holding the back edge of the bandsaw blade against the feeding force.

Heretofore, in order to hold the bandsaw blade against the feeding force, wheel-like roller members or otherwise rotatable thrust bearing members have been applied to the back blade edge. However, the bandsaw machines have conventionally suffered from serious disadvantages as to holding the bandsaw blade against the feeding force especially when cutting difficult-to-cut materials or workpieces such as stainless steels, tool steels and super-alloys.

One of the major disadvantages of the conventional bandsaw guide means has been the fact that the back-up guide member is unable to sufficiently overcome the feeding force in several respects especially when cutting the difficult-to-cut materials. The roller-type back-up guide member of the conventional bandsaw guide means cannot sufficiently hold the bandsaw blade against the feeding force, since it keeps in contact with the back edge of the bandsaw blade only by a small point-like area. The back-up guide member of the thrust bearing type cannot hold the bandsaw blade against a large feeding force necessary especially to cut the difficult-to-cut materials, since it is subjected to a thrust load axially from the bandsaw blade. Also, any of the back-up guide members of the conventional bandsaw guide means have experienced premature wear and damage, since the roller-type back-up guide member will be cut into by concentrated load caused by the back edge of the bandsaw blade and the thrust bearing guide member is subjected to sliding friction of the back edge of the same.

Another but very serious disadvantage with the conventional bandsaw guide means has been that the back-up guide member is unable to resiliently respond to reactions or shocks occurring during cutting operations especially when the bandsaw blade is being worked with a large feeding force. As a matter of actual fact, the bandsaw blade is not evenly or uniformly formed with teeth and has inevitably irregularly higher teeth which will cut into the workpiece too deeply and will be liable to break. Also, materials to be cut will often contain irregularly hard portions into which the teeth of the bandsaw blade cannot cut at a predetermined feeding rate without breaking. For these reasons, it is desired that the back-up guide member can resiliently respond to reactions or shocks occurring during cutting operations so as to enable the bandsaw blade to slightly move or bend back in the direction away from the workpiece to be cut or stop cutting into the workpiece. The conventional back-up guide members have been fixedly mounted in the bandsaw guide means in such a manner as to compel the bandsaw blade to work at any conditions with a predetermined feeding force, and as the result the bandsaw blade will be liable to premature wear and breakage especially when cutting difficult-to-cut materials with a larger feeding force.

Recently, there has been an increased requirement to perform cutting operations with a large feeding force to cut difficult-to-cut materials in many industries, and for this purpose it has been strongly desired to obviate the above-described disadvantages with the conventional bandsaw machines.

SUMMARY OF THE INVENTION

It is a primary object of the present invention to provide a bandsaw blade guiding apparatus for bandsaw machines which has the capability of reliably holding the bandsaw blade against any feeding force.

It is another object of the present invention to provide a bandsaw blade guiding apparatus for bandsaw machines which will enable the bandsaw blade to cut difficult-to-cut materials with a larger feeding force.

It is a further object of the present invention to provide a bandsaw blade guiding apparatus for bandsaw machines having an extended useful service life.

It is a still further object of the present invention to provide a bandsaw blade guiding apparatus for bandsaw machines which will lengthen the life of the bandsaw blade.

Another object of the present invention to provide an economical high performance bandsaw machine which can perform cutting operations especially with a large feeding force and with a longer tool life to cut difficult-to-cut materials.

Basically, these objects can be accomplished by providing a bandsaw blade guiding apparatus with a flat back-up guide member having an antifriction member such as a cemented carbide and a resilient member for resiliently backing the back-up guide member.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
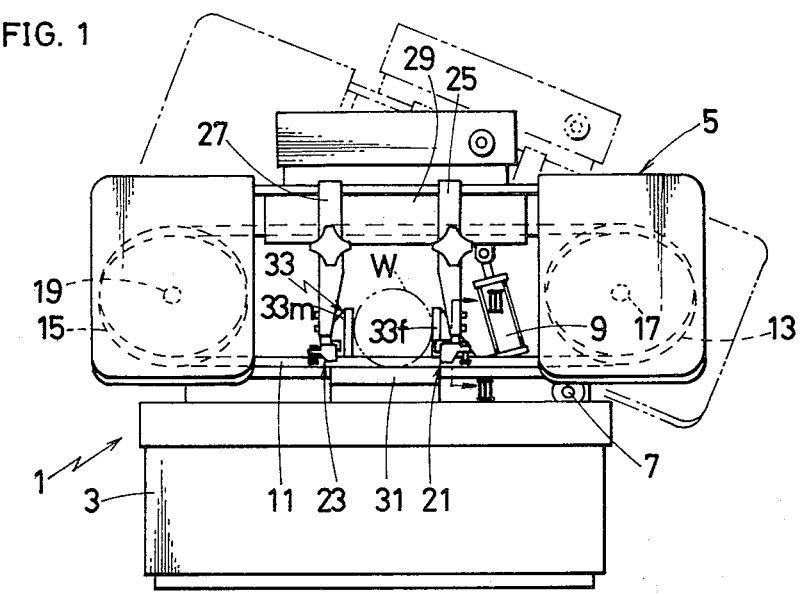
FIG. 1 is a front elevational view of a horizontal bandsaw machine embodying the principles of the present invention.

Referring now to FIG. 1, there is shown a horizontal bandsaw machine which is generally designated by the numeral 1 and comprises a box-like base 3 and a saw head assembly 5 vertically movable toward and away from the base 3 as is conventional. The saw head assembly 5 is pivotally connected to the base 3 by means of a hinge pin 7 and is so arranged as to be raised and lowered away from and toward the base 3 by a hydraulic motor 9 of a piston cylinder type. In the saw head assembly 5, a flexible endless bandsaw blade 11 is trained around a pair of driving and driven wheels 13 and 15 having shafts 17 and 19, respectively, so that it may be driven to make a cutting action when the driving wheel 13 is power driven. The bandsaw blade 11 at the cutting zone of the horizontal bandsaw machine 1 is slidably held or guided with its cutting edges facing vertically downwardly by a pair of guide assemblies 21 and 23 which will be described in great detail hereinafter. The guide assemblies 21 and 23 are detachably fixed or integrally provided at lower ends of depending arm members 25 and 27, respectively, which are adjustably held by a beam member 29 fixed at the upper portion of the saw head assembly 5. Also, a work-table 31 is mounted at the cutting zone on the base 3 so that a workpiece W to be cut may be placed thereon, and a vise assembly 33 having a fixed jaw 33f and a movable jaw 33m is also mounted on the base 3 to hold the workpiece W to be cut therebetween. Thus, when the saw head assembly 5 is swung down around the hinge pin 7 from its raised position shown by the imaginary lines in FIG. 1, the bandsaw blade 11 rotating around the driving and driven wheels 13 and 15 in the saw head assembly 5 will be fed to cut the workpiece W held by the vise assembly 33 on the work-table 31.

In this connection, it should be noted that the present invention is applicable to any suitable known type of bandsaw machines, although the invention has been and will be described hereinbefore and hereinafter with regard to the horizontal bandsaw machine 1 in which the saw head assembly 5 carrying the bandsaw blade 11 is swung up and down around the hinge pin 7. For example, the present invention is also applicable to horizontal bandsaw machines in which a cutting head assembly is vertically moved in its entirety along a single or a plurality of vertical guide means such as a post or posts, and it is further applicable to vertical bandsaw machines in which a bandsaw blade travels vertically around upper and lower wheels.

In the arrangement described above, the guide assemblies 21 and 23 are so disposed as to slidably hold the bandsaw blade 11 at the cutting zone to keep the cutting edge of the bandsaw blade 11 faced perpendicularly toward the workpiece W to be cut and also to prevent the bandsaw blade 11 from moving sidewards and vibrating. Also, the guide assemblies 21 and 23 are made to twist the bandsaw blade 11 at the cutting zone to keep its cutting edge faced vertically toward the workpiece W to be cut, since the shafts 17 and 19 of the driving and driven wheels 13 and 15 are disposed to be tilted in the preferred embodiment. Since the guide assemblies 21 and 23 according to the present invention may be of the same construction, descriptions will be made only with regard to the guide assembly 21 in reference to FIGS. 2 and 3.

Figure 3:
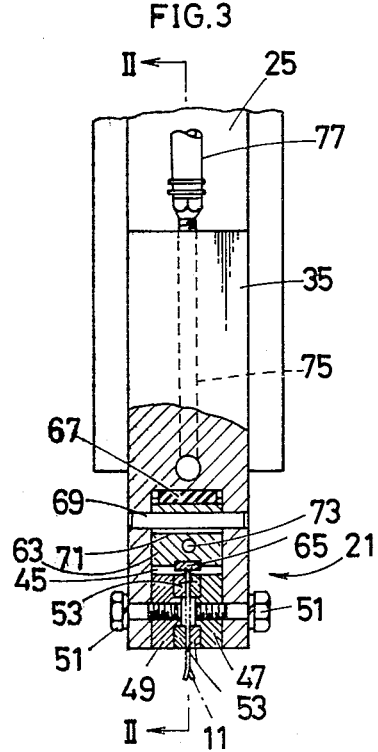
FIG. 3 is an enlarged partial view shown in section substantially taken along the line III—III of FIG. 1.
Figure 2:
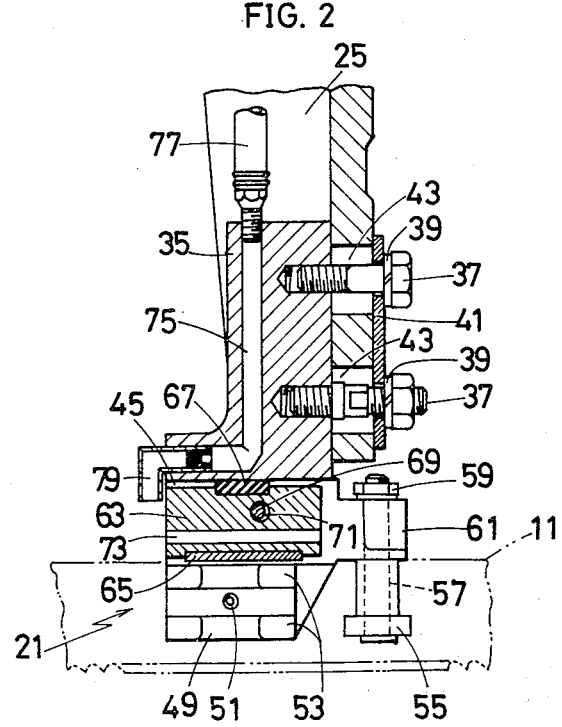
FIG. 2 is an enlarged partial front view showing a portion of the horizontal bandsaw machine shown in FIG. 1 partially in section substantially taken along the line II—II of FIG. 3.

Referring to FIGS. 2 and 3, the guide assembly 21 is constructed of a body 35 which is detachably fixed to or integrally formed with the lower end of the arm member 25 depending from the beam member 29. In the preferred embodiment, the lower end of the arm member 25 is formed to be L-shaped in horizontal section or otherwise channel-like, and the body 35 of the guide assembly 21 is fixed to the lower end of the arm member 25 by a plurality of bolts 37 with washers 39 and an elongate plate-like spacer 41. The bolts 37 extend through slot-like holes 43 formed in the lower end of the arm 25 so that the height of the body 35 can be adjusted.

As best shown in FIG. 3, the lower end of the body 35 of the guide assembly 21 is bifurcate to form a channel-like concavity 45 opening downwardly so that the bandsaw blade 11 may pass therethrough. In order to slidably hold the sides of the bandsaw blade 11 with its cutting edge faced vertically toward the workpiece W to be cut, guide members 47 and 49 are detachably fixed to the lower end of the channel-like concavity 45 of the body 35 of the guide assembly 21 by suitable means such as bolts 51. In the preferred embodiment, each of the sideward guide member 47 and 49 is of a square block member which may be provided with a plurality of antifriction members such as cemented carbides 53 for slidably holding the bandsaw blade 11. Thus, the bandsaw blade 11 is slidably held with its cutting edge faced vertically toward the workpiece W to be cut and kept from sidewardly moving at the cutting zone by the sideward guide members 47 and 49. Also, in order to further hold the sides of the bandsaw blade 11 in addition to the sideward guide members 47 and 49, there may be provided a pair of guide rollers 55, only one of which is shown in FIG. 2 as having a shaft 57 and being rotatably supported by means of a nut 59 at a projection 61 which is formed at the lower portion of the body 35 of the guide assembly 21.

In order to hold the back edge of the bandsaw blade 11, there is provided a back-up guide member 63 which is located just above the sideward guide members 47 and 49 in the channel-like concavity 45 of the body 35 of the guide assembly 21. The back-up guide member 63 is a square block having a flat top and having a vertical dimension or thickness slightly less than the space between the top surface of the channel-like concavity 45 and the line where the back edge of the bandsaw blade 11 lies. Also, the back-up guide member 63 is provided at its bottom with an antifriction member 65 such as a cemented carbide for holding the back edge of the bandsaw blade 11, and it is further provided at its top with a resilient member 67 such as a urethane rubber. The antifriction member 65 is an elongate flat member, and it is integrally fixed to the bottom of the back-up guide member 63 in such a manner as to duly hold the back edge of the bandsaw blade 11. The resilient member 67 is so arranged as to slightly project from the top surface of the back-up guide member 63 normally when not compressed under load and to keep always in contact with the top surface of the channel-like concavity 45. Thus, the back-up guide member 63 will be normally kept out of contact with the top surface of the channel-like concavity 45 by the resilient member 67, but it can be brought into contact therewith when the resilient member 67 is strongly compressed under load. Also, the back-up guide member 63 is slightly movably held in position by a pin 69 which extends through a hole 71 formed through the back-up guide member 63 and is fixed at its ends to the body 35 of the guide assembly 21. The hole 71 of the back-up guide member 63 is formed larger than the diameter of the pin 69 in such a manner as to enable the back-up guide member 63 to normally keep out of contact with the top surface of the channel-like concavity 45 but go up into contact therewith when the resilient member 67 is strongly compressed.

From the above description, it will be now understood that the bandsaw blade 11 is duly held by the back-up guide member 63 by means of the flat antifriction member 65 against the feeding force or reaction to which the bandsaw blade 11 is subjected. Also, it will be understood that the bandsaw blade 11 can move slightly or bend in the direction away from the workpiece W to be cut or otherwise stop cutting into the workpiece W when subjected to too strong cutting reaction since the back-up guide member 63 is held resiliently by the resilient member 67. Furthermore, although heat may be generated by the friction between the antifriction member 65 of the back-up guide member 63 and the back edge of the bandsaw blade 11, the resilient member 67 will not be subjected to such heat, since it is provided at the top of the back-up guide member 63 far away from the antifriction member 65.

Referring again to FIGS. 2 and 3, the back-up guide member 63 is formed with an elongate hole 73 in parallel with its bottom so as to completely cut off any degree of heat generated between the antifriction member 65 of the back-up guide member 63 and the back edge of the bandsaw blade 11 although such heat will hardly reach the resilient member 67. Also, in order to supply the bandsaw blade 11 with coolant, the body 35 of the guide assembly 21 is formed with a coolant passage 75 which is connected with a supply pipe 77, and there is provided with a nozzle 79 which is connected to the coolant passage 75.

As has been far described in the above, the bandsaw blade guiding apparatus that is the guide assembly 21 or 23 according to the present invention is distinguished by the back-up guide member 63 which has the flat antifriction member 65 for holding the back edge of the bandsaw blade 11 and is resiliently backed by the resilient member 67. As has been already understood, the bandsaw blade guiding apparatus having the characteristic back-up member 63 according to the present invention has many features over the conventional apparatus to reliably hold the bandsaw blade 11 in the horizontal bandsaw machine 1. Since the back-up guide member 63 is so designed as to hold the bandsaw blade 11 by means of the flat antifriction member 65 which will keep in surface contact with the back edge of the bandsaw blade 11, it will duly hold the bandsaw blade 11 against the feeding force during the cutting operations without being subjected to concentrated load. Accordingly, the back-up guide member 63 can not ony reliably hold the bandsaw blade 11 against a large feeding force which is necessary to cut difficult-to-cut materials, but also it will stand long use without being prematurely worn or damaged by the bandsaw blade 11. Also, since the back-up guide member 63 is resiliently backed by the resilient member 67, it will resiliently respond to reactions or shocks occurring during cutting operations so as to enable the bandsaw blade 11 to resiliently move or bend in the direction away from the workpiece W to be cut or stop cutting into the workpiece W. Accordingly, both of the guide assembly 21 or 23 and the bandsaw blade 11 will not be subjected to severe reactions or shocks even when making a cutting with a large feeding force and they will stand long use without being damaged by such reactions or shocks. Also, although frictional heat may be produced between the flat antifriction member 65 and the back edge of the bandsaw blade 11, the resilient member 67 will not be damaged by such frictional heat, since the resilient member 67 is provided at the top of the back-up guide member 63 apart from the antifriction member 65 and furthermore the elongate hole 73 may be formed to cut off such heat.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A bandsaw blade guiding apparatus comprising:
a support arm forming a cavity through which the blade moves;
a guide block mounted within said cavity for pivotal movement about an axis extending transversally with respect to the direction of blade movement;
an anti-friction member fixed to the bottom surface of said guide block, said anti-friction member having a flat surface contacting the back edge of the blade during a cutting operation;
a resilient member interposed between the top surface of said guide block and the base of said cavity; and
a through passageway in said guide block between said anti-friction member and said resilient member.

2. A bandsaw blade guiding apparatus comprising:
a support arm forming a cavity through which said blade moves;
a guide block in said cavity, the bottom surface of said guide block being arranged to support the back edge of said blade;
a pin fixed relative to said support arm and extending through an opening in said guide block in a direction transverse to the path of said blade, said opening being dimensioned in relation to said pin to accommodate both pivotal and limited translational movement of said guide block relative to said arm; and
resilient means interposed between the top surface of said guide block and the base of said cavity for yieldingly opposing the pivotal and translational movement of said guide block.

* * * * *